(12) United States Patent
Umansky et al.

(10) Patent No.: US 9,267,083 B2
(45) Date of Patent: Feb. 23, 2016

(54) MERCAPTAN REMOVAL USING MICROREACTORS

(71) Applicants: Benjamin S. Umansky, Fairfax, VA (US); Charles R. Bolz, West Chester, PA (US); Anjaneya S. Kovvali, Fairfax, VA (US); Carlos N. Lopez, Amissville, VA (US); Rathna P. Davuluri, Fairfax, VA (US)

(72) Inventors: Benjamin S. Umansky, Fairfax, VA (US); Charles R. Bolz, West Chester, PA (US); Anjaneya S. Kovvali, Fairfax, VA (US); Carlos N. Lopez, Amissville, VA (US); Rathna P. Davuluri, Fairfax, VA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 14/095,137

(22) Filed: Dec. 3, 2013

(65) Prior Publication Data

US 2014/0174982 A1 Jun. 26, 2014

Related U.S. Application Data

(60) Provisional application No. 61/740,494, filed on Dec. 21, 2012.

(51) Int. Cl.
*C10G 65/12* (2006.01)
*C10G 65/04* (2006.01)
*C10G 45/02* (2006.01)
*B01J 19/00* (2006.01)

(52) U.S. Cl.
CPC ............. *C10G 65/12* (2013.01); *B01J 19/0093* (2013.01); *C10G 45/02* (2013.01); *C10G 65/04* (2013.01); *B01J 2219/0079* (2013.01); *B01J 2219/0086* (2013.01); *B01J 2219/00835* (2013.01); *B01J 2219/00869* (2013.01); *B01J 2219/00873* (2013.01); *C10G 2300/1044* (2013.01); *C10G 2300/202* (2013.01); *C10G 2300/70* (2013.01)

(58) Field of Classification Search
CPC .................. C10G 45/02; C10G 65/04; C10G 2300/1044; C10G 2300/202; C10G 2300/70; B01J 19/0093; B01J 2219/0079; B01J 2219/00835; B01J 2219/0086; B01J 2219/00869; B01J 2219/00873
USPC .................................. 208/58, 89, 97, 143, 189
See application file for complete search history.

(56) References Cited

U.S. PATENT DOCUMENTS

| 7,074,321 | B1 * | 7/2006 | Kalnes ............................. 208/58 |
| 7,507,328 | B2 | 3/2009 | Ellis et al. |
| 2003/0188992 | A1 | 10/2003 | Halbert et al. |

(Continued)

OTHER PUBLICATIONS

The International Search Report and Written Opinion of PCT/US2013/072784 dated Jan. 27, 2014.

*Primary Examiner* — Prem C Singh
*Assistant Examiner* — Brandi M Doyle
(74) *Attorney, Agent, or Firm* — Chad A. Guice (57) ABSTRACT

Processes are provided herein for producing naphtha boiling range products with a desired sulfur content by reducing the mercaptan content of the naphtha boiling range products after the products exit a hydroprocessing stage. Due to mercaptan reversion, naphtha boiling range products that contain even small amounts of olefins can have a higher than expected sulfur content after hydroprocessing. In order to reduce or mitigate the effects of mercaptan reversion, microchannel reactors (or microreactors) can be placed in a processing system downstream of a reactor that produces a low sulfur naphtha product. The microreactors can include a coating of metals that have activity for hydrodesulfurization. By passing at least a portion of the naphtha product through the downstream microreactors, the mercaptans formed by reversion reactions can be reduced or eliminated, resulting in a naphtha product with possessing a very low sulfur content.

19 Claims, 4 Drawing Sheets

(56) References Cited

U.S. PATENT DOCUMENTS

| | | | |
|---|---|---|---|
| 2006/0102519 A1* | 5/2006 | Tonkovich et al. ........... 208/107 |
| 2008/0184915 A1 | 8/2008 | Tonkovich et al. |
| 2011/0083997 A1* | 4/2011 | Silva .................... B01J 19/0093 208/60 |

* cited by examiner

MERCAPTAN REMOVAL USING MICROREACTORS

CROSS-REFERENCE TO RELATED APPLICATIONS

This application claims priority to U.S. Provisional Application Ser. No. 61/740,494 filed Dec. 21, 2012, which is herein incorporated by reference in its entirety.

FIELD

This invention provides a process for the manufacture of low sulfur fuel products and/or refinery products. In particular this invention provides for processes using catalytic microreactors for treating of refinery fuel fractions.

BACKGROUND

One conventional technique for processing of cracked naphthas involves performing a selective hydrodesulfurization of the cracked naphtha. A selective hydrodesulfurization refers to a process where sulfur is removed from the naphtha while minimizing the amount of olefin saturation that occurs in the reaction. Avoiding olefin saturation is valuable, as it leads to a higher octane naphtha product. Retaining a higher octane value allows a selectively hydrodesulfurized feed to be used as a naphtha fuel stock without having to use a reforming step.

The catalysts used for a selective hydrodesulfurization process typically include a combination of a Group VI metal and a Group VIII metal on a suitable support, such as a catalyst including cobalt and molybdenum on an alumina support. A number of compounds have previously been identified as reaction inhibitors for selective hydrodesulfurization catalysts. These reaction inhibitors reduce the activity of the catalyst for performing hydrodesulfurization.

U.S. Pat. No. 7,507,328 describes a method for selective naphtha hydrodesulfurization and mercaptan decomposition. An olefinic naphtha stream is selectively desulfurized in a hydrodesulfurization reaction stage. The hydrodesulfurized effluent stream is separated into a light and heavy liquid fraction, and the heavier fraction is further processed in a mercaptan destruction stage to reduce the content of mercaptan sulfur in the final product.

SUMMARY OF PREFERRED EMBODIMENTS OF THE INVENTION

In an embodiment, a method for treating a naphtha boiling range fraction is provided. The method includes receiving a hydroprocessed effluent comprising a naphtha boiling range fraction, the naphtha boiling range fraction comprising a sulfur content of about 200 wppm or less and comprising at least about 50 wppm of olefins, mercaptans, or a combination thereof; and exposing at least a portion of the naphtha boiling range fraction to a hydrotreating catalyst at a temperature of from about 400° F. (204° C.) to about 600° F. (316° C.), preferably at least about 450° F. (232° C.) and preferably about 550° F. (288° C.) or less, to form a treated effluent portion having a sulfur content of about 50 wppm or less, the treated effluent portion having a lower sulfur content than the sulfur content of the naphtha boiling range fraction, wherein the hydrotreating catalyst is located on surfaces of walls for a plurality of microreactors, the plurality of microreactors having a length dimension of about 10 µm to about 2 mm and a depth dimension of about 10 µm to about 2 mm, the plurality of microreactors being located in a different vessel from a hydroprocessing reaction stage that generated the naphtha boiling range fraction.

DETAILED DESCRIPTION OF THE PREFERRED EMBODIMENTS

In various embodiments, processes are provided for producing naphtha boiling range products with a desired sulfur content by reducing the mercaptan content of the naphtha boiling range products after the products exit a hydroprocessing stage. Due to mercaptan reversion, naphtha boiling range products that contain even small amounts of olefins can have a higher than expected sulfur content after hydroprocessing. In order to reduce or mitigate the effects of mercaptan reversion, microchannel reactors (or microreactors) can be placed in a processing system downstream of a reactor that produces a low sulfur naphtha product. The microreactors can include a coating of metals that have activity for hydrodesulfurization. By passing at least a portion of the naphtha product through the downstream microreactors, the mercaptans formed by reversion reactions can be reduced or eliminated, resulting in a naphtha product with a lower sulfur content.

One type of process that can lead to production of naphtha products is a selective hydrodesulfurization process for a naphtha boiling range feed. A selective hydrodesulfurization process can be used to desulfurize a naphtha boiling range feed that also contains olefins. A naphtha boiling range output from a fluid catalytic cracking process (FCC) is an example of a naphtha boiling range feed that contains both sulfur and olefins.

In a selective hydrodesulfurization process, a variety of considerations can be balanced in order to choose the processing temperature. It is often desirable to remove sulfur to a level that corresponds to the current requirements for low sulfur fuels. For example, production of a naphtha product with about 10 wppm or less of sulfur is often desirable. Another consideration is maintaining the activity of the catalyst. Typically, a catalyst will deactivate more quickly during higher temperature operation. Thus, lower operating temperatures can be preferred, particularly during the initial processing period after new catalyst has been added to a hydroprocessing reactor. Still another consideration is preservation of olefins in the resulting naphtha product. Typically, processing a feed at a temperature that is higher than necessary to meet a desired sulfur specification will result in additional saturation of olefins. This consideration would tend to suggest that lower reaction temperatures are preferable, to avoid overprocessing of a feed. However, the selectivity of a catalyst can increase with increasing temperature. Here, selectivity refers to the relative activity for hydrodesulfurization versus activity for olefin saturation. Thus, there are factors that favor both lower and higher temperature processing.

Still another factor for a selective desulfurization process is determining how to reduce or mitigate the creation of "reversion mercaptans" at the end of the desulfurization process. As noted above, olefins are preserved within a feed during selective desulfurization. These olefins can recombine with $H_2S$ gas present in the product effluent from desulfurization to form mercaptans. Thus, even though a selective hydrodesulfurization process may be effective for reducing the sulfur content of a feedstock to a value below a desired target within a reactor, when the resulting effluent is cooled after processing, mercaptans may form that cause an increase in the sulfur content of the liquid portion of the effluent. These mercaptans can potentially increase the sulfur content of the liquid effluent to a value above a desired target level.

More generally, processes are also provided for producing naphtha boiling range products with a desired sulfur content. Naphtha boiling range products derived from other types of feeds can have lower amounts of olefin content. An example of a process that can potentially generate both a naphtha boiling range product and a distillate boiling range product that contain olefins is a process for hydrocracking of a distillate boiling range feed or another heavier feed. The naphtha formed during hydrocracking of a higher boiling range feed is often an unwanted and/or incidental side product. In a hydrocracking situation, a feed could initially have as little as 20 wppm of olefins, and could end up with 200 wppm of olefins in an output naphtha fraction. In spite of the low concentration of olefins in the output naphtha fraction(s), such olefins are also susceptible to mercaptan reversion reactions.

In a hydrocracking process, prior to and/or during hydrocracking that forms a naphtha product from a higher boiling range feed, the feed can be desulfurized. The desulfurization will often be sufficient to remove substantially all sulfur from the naphtha boiling product. However, until an appropriate separation is performed, the naphtha boiling range product (that contains olefins) is also susceptible to mercaptan reversion reactions. As a result, even though the reaction conditions prior to and/or during hydrocracking are sufficient to produce a naphtha product with a desired sulfur content, mercaptans formed after the naphtha product exits the hydrocracking reactor can result in a naphtha product with an undesirable amount of sulfur content. Downstream microreactors can also be used to decompose mercaptans in these lower olefin content streams.

Feedstocks

In various embodiments, the definition of a "feedstock" will depend on what is viewed as the starting point for a process. Possible starting points for describing a process can include (but are not limited to) starting at a point after some type of processing and/or hydroprocessing has been performed that results in a olefin-containing naphtha boiling range fraction; or starting at a point where an olefin-containing naphtha boiling range feed is about to be exposed to (selective) hydrodesulfurization conditions in a hydroprocessing reactor; or starting at a point where a distillate boiling range feed (or a still higher boiling range feed) is about to be exposed to hydroprocessing that will result in conversion of a portion of the distillate boiling range feed to an olefin-containing naphtha boiling range product.

In the discussion herein, reference is made to naphtha boiling range fractions (including feeds, products, or streams) and distillate boiling range fractions (including feeds, products, or streams). The naphtha boiling range can be defined based on an initial boiling point and/or the temperature at which 5 wt % of the feed will boil. In some embodiments, an initial boiling point and/or a T5 boiling point can correspond to about the boiling point for a C5 alkane. In this type of alternative, it is noted that n-pentane boils at about 36° C., isopentane boils at about 28° C., and neopentane boils at about 10° C. Thus, an initial boiling point or a temperature at which 5 wt % of the feed will boil can correspond to any of the above boiling points for C5 alkanes. In other embodiments, the initial boiling point and/or the T5 boiling point can be higher, such as at least about 50° C. The final boiling point for the naphtha boiling can be 450° F. (232° C.) or less, such as 400° F. (204° C.) or less. As an example, the maximum naphtha boiling range based on the above definitions is a range from about the boiling point of neopentane (about 50° F. or 10° C.) to about 450° F. (232° C.). In a preferred embodiment, the naphtha has a boiling range with a T5 boiling point of about 50° F. (10° C.) and a T95 boiling point of about 450° F. (232° C.).

For a distillate boiling range feed, a feed can have a boiling range of from about 300° F. (149° C.) to about 800° F. (427° C.). For example, a distillate feed that includes a kerosene portion as part of feed can have an initial boiling point and/or temperature at which 5 wt % of the feed will boil of at least about 300° F. (149° C.), such as at least about 350° F. (177° C.). If a kerosene portion is not included in the distillate feed, the feed can have an initial boiling point and/or temperature at which 5 wt % of the feed will boil of at least about 400° F. (204° C.), such as at least about 450° F. (232° C.).

Still higher initial boiling points could be used for a feed to a lubricating oil hydrocracking process and/or a vacuum gas oil hydrocracking process. For such feeds, an initial boiling point and/or temperature at which 5 wt % of the feed will boil can be at least about 500° F. (260° C.), such as at least about 600° F. (316° C.). The final boiling point of a distillate boiling range feed can correspond to a temperature for an initial boiling point of a bottoms fraction from an atmospheric distillation tower. Suitable final boiling points and/or temperatures where 95 wt % of a distillate feed will boil can be about 800° F. (427° C.) or less, such as 750° F. (399° C.) or less. Alternatively, for a feed including heavier compounds, the final boiling point and/or temperature where 95 wt % of a distillate feed will boil can be about 1050° F. (566° C.) or less, such as about 950° F. (510° C.) or less.

Another option for characterizing a feedstock is based on a percentage of the feedstock that boils above a temperature. Optionally, such a characterization temperature can correspond to a desired conversion temperature during processing of a feed. For example, for some heavier feeds, processes can be characterized based on the amount of conversion that is performed on the feed relative to a conversion temperature of about 700° F. (371° C.) or less, such as about 650° F. (343° C.) or less, or alternatively about 750° F. (399° C.) or less. A convenient way to characterize a feedstock for using in such a conversion process is based on the weight percentage of feedstock that boils above the desired conversion temperature prior to the conversion process, such as at least about 20 wt %, or at least about 30 wt %, or at least about 40 wt %, or at least about 50 wt %. A similar conversion temperature characterization can be used for lighter feeds, such as describing a feedstock based on the amount of feedstock that boils at a temperature of at least about 350° F. (177° C.), or at least about 400° F. (204° C.), or at least about 450° F. (232° C.). Such feeds can contain at least about 20 wt % that boils above the conversion temperature, such as at least about 30 wt %, or at least about 40 wt %, or at least about 50 wt %.

In some embodiments, a process can include an initial (selective) hydrodesulfurization of a naphtha feedstock followed by a mercaptan decomposition process using microreactors. In such embodiments, a feedstock for a hydrodesulfurization process can be an olefinic naphtha boiling range feed. Suitable feedstocks can boil in the range from about 50° F. (10° C.) to about 450° F. (232° C.). Alternatively, the initial boiling point and/or the temperature at which 5 wt % of the feed will boil can correspond to about the boiling point for a C5 alkane. In this type of alternative, it is noted that n-pentane boils at about 36° C., isopentane boils at about 28° C., and neopentane boils at about 10° C. Thus, an initial boiling point or a temperature at which 5 wt % of the feed will boil can correspond to any of the above boiling points for C5 alkanes. With regard to olefin content, suitable feedstocks include feedstocks having a wide range olefin content. For some types of feeds, such as feeds to a hydrocracking process, the initial olefin content may be as low as about 50 wppm or less, such as about 20 wppm or less. After hydrocracking, the naphtha boiling range output(s) from hydrocracking may have an olefin content of about 100 wppm to about 250 wppm, such as less than about 200 wppm. Other types of feeds, such as a feed based on the naphtha boiling range output from a coker, can have olefin contents between about 1 wt % to about 15 wt %. Still other types of feeds, such as a feed based on the naphtha boiling range output from a fluid catalytic cracking unit, can have an olefin content from about 15 wt % to about 40 wt %, such as about 30 wt % or less. For some olefinic naphthas, still higher olefin contents may be possible, such as up to about 60 wt % or less. Non-limiting examples of suitable feedstocks that can benefit from mercaptan reversion using microreactors include fluid catalytic cracking unit naphtha (FCC catalytic naphtha or cat naphtha), steam cracked naphtha, coker naphtha, or a combination thereof. This can include blends of olefinic naphthas (olefin content of at least about 5 wt %) with non-olefinic naphthas.

The sulfur content of a naphtha feedstock that has not been previously exposed to a hydrodesulfurization and/or hydrocracking process can be at least about 100 wppm, or at least about 500 wppm, or at least about 1000 wppm, or at least about 1500 wppm. In another embodiment, the sulfur content can be about 7000 wppm or less, or about 6000 wppm or less, or about 5000 wppm or less, or about 3000 wppm or less. The sulfur will typically be present as organically bound sulfur. That is, as sulfur compounds such as simple aliphatic, naphthenic, and aromatic mercaptans, sulfides, di- and polysulfides and the like. Other organically bound sulfur compounds include the class of heterocyclic sulfur compounds such as thiophene and its higher homologs and analogs. After hydrodesulfurization, such as at the exit of the desulfurization reactor, the sulfur content can be about 50 wppm or less, such as about 25 wppm or less, or about 15 wppm or less, or about 10 wwpm or less. These sulfur contents correspond to sulfur contents before substantial mercaptan reversion has occurred. Additionally or alternatively, after selective hydrodesulfurization and prior to mercaptan decomposition, the intermediate naphtha product may experience mercaptan reversion that leads to an increased sulfur content. The sulfur content for an intermediate naphtha product prior to mercaptan decomposition can be about 200 wppm or less, and preferably 100 wppm or less, such as about 50 wppm or less, or about 25 wppm or less, or about 15 wwpm or less.

Nitrogen can also be present in the feed. In an embodiment, the amount of nitrogen can be at least about 5 wppm, or at least about 10 wppm, or at least about 20 wppm, or at least about 40 wppm. In another embodiment, the nitrogen content can be about 250 wppm or less, or about 150 wppm or less, or about 100 wppm or less, or about 50 wppm or less.

In some embodiments, a process can correspond to a mercaptan decomposition process using microreactors where the process is performed on the naphtha boiling range portion of an effluent from conversion of a distillate boiling range feed. In such embodiments, the mercaptan decomposition can be performed on one or more fractions generated from hydrocracking (or another conversion process) performed on a distillate fraction or another type of feed (such as feed generated from another type of process). Additionally or alternatively, a feedstock can correspond to a naphtha boiling range portion of an effluent from a non-selective hydrodesulfurization process. This includes non-selective hydrodesulfurizations of naphtha boiling range feeds as well as hydrodesulfurizations of wider boiling range feeds that include, for example, both a naphtha boiling range portion and a higher boiling range portion.

The sulfur content of a naphtha boiling fraction after hydroprocessing but prior to a mercaptan decomposition process is preferably about 100 wppm or less, or about 50 wppm or less, or about 30 wppm or less, or at least about 20 wppm or less. It is noted that still higher sulfur contents can be present for such a naphtha boiling range fraction. However, in many instances, the benefit of performing mercaptan reversion will be reduced or minimized if the feed has too large of a sulfur content prior to mercaptan reversion. The sulfur will typically be present as organically bound sulfur. In some embodiments, the amount of mercaptan sulfur in the olefinic fraction prior to mercaptan decomposition can be about 40 wppm or less, such as about 30 wppm or less, or about 20 wppm or less, or about 10 wppm or less. Additionally or alternately, the amount (weight) of mercaptan sulfur can correspond to at least about 20% of the sulfur content of the olefinic fraction, such as at least about 40%, or at least about 50%, or at least about 60%. The high relative percentage of mercaptan sulfur reflects the fact that most feeds to the mercaptan decomposition process will be substantially desulfurized feeds.

Nitrogen can also be present in the feed to the microreactors for mercaptan decomposition, but preferably the nitrogen content is low. In an embodiment, the amount of nitrogen can be about 40 wppm or less, or about 20 wppm or less, or about 10 wppm, or about 5 wppm or less.

Mineral distillate (or higher boiling) feedstreams can have a nitrogen content from about 50 to about 2000 wppm nitrogen, preferably about 50 to about 1500 wppm nitrogen, and more preferably about 75 to about 1000 wppm nitrogen. Depending on the type of initial process, distillate (or higher boiling) feedstreams suitable for use herein can have a sulfur content from about 100 to about 20,000 wppm sulfur, preferably about 200 to about 10,000 wppm, and more preferably about 350 to about 5,000 wppm. Optionally, a distillate feedstream can also include at least a portion of a feedstock derived from a biological source.

Examples of Reaction Configurations

Figure 1:
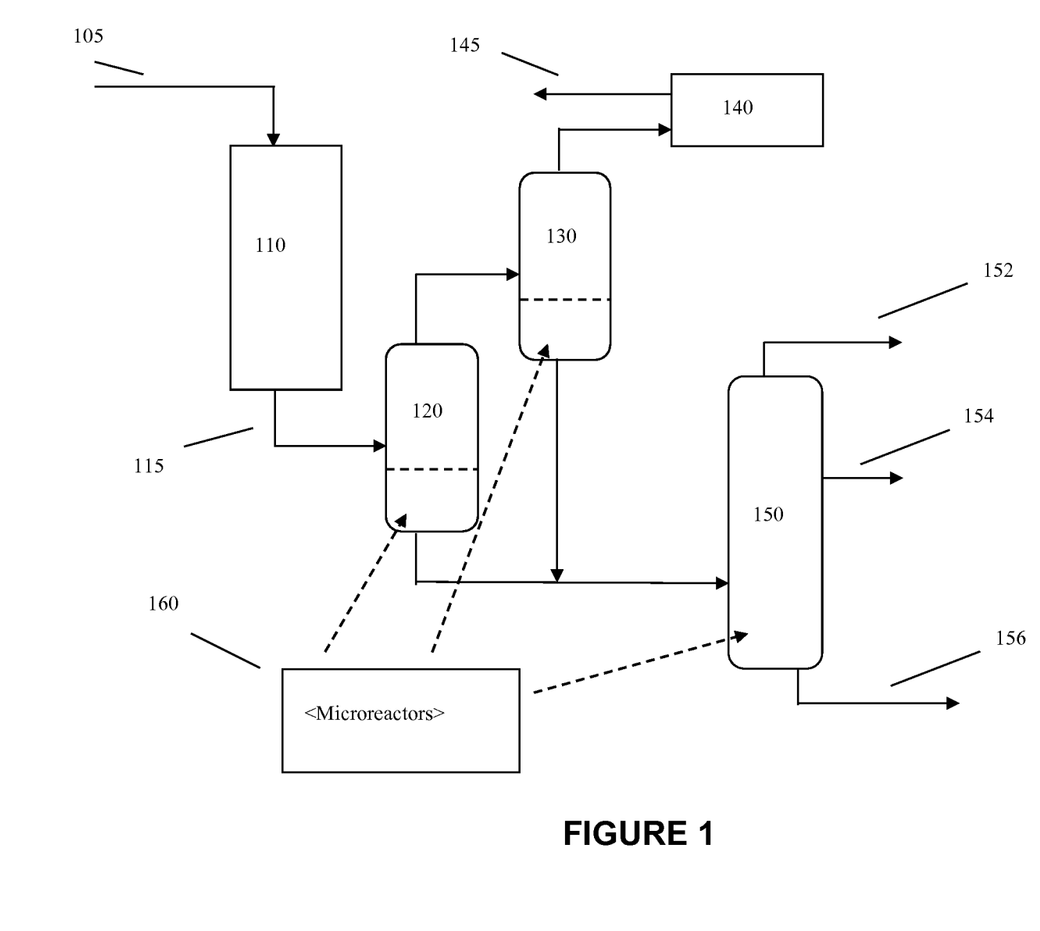
FIG. 1 schematically shows a reaction system for performing a process according to an embodiment of the invention.

FIG. 1 schematically shows an example of a reaction system for performing mercaptan decomposition according to the invention. The reaction system shown in FIG. 1 is meant to illustrate various locations within a reaction system where mercaptan decomposition can be performed using microreactors. Although the specific configuration in FIG. 1 is related to distillate hydroprocessing, it is understood that microreactors can similarly be deployed in reaction systems for naphtha desulfurization, heavy oil hydroprocessing, or another type of reaction system that generates an olefin-containing naphtha and/or distillate product or side product.

In FIG. 1, an example of a reaction system for conversion of a distillate feed is shown. One or more input streams 105 are introduced into the reactor 110, such as a distillate boiling range feedstock and a hydrogen stream. The reactor 110 can represent multiple reactors and/or reaction stages. Reactor 110 can include one or more beds of a hydrotreating catalyst, hydrocracking catalyst, or a combination thereof. The feedstock is exposed to the catalyst in reactor 110 in the presence of the hydrogen under effective conditions for performing hydroprocessing. The effluent 115 from reactor 110 is then separated in one or more separation stages. In FIG. 1, a combination of a high temperature separator 120 and a low temperature separator 130 is shown. Alternatively, a high pressure separator and a low pressure separator could be used. Still another option is to use any other convenient type or combination of separators that is suitable for separating desired products from contaminants and/or other lower boiling compounds. The lower boiling compounds exiting from separator 130 are then passed through an amine absorber 140 to remove contaminants. The cleaned hydrogen effluent 145 can then be used as a recycled hydrogen stream. The higher boiling compounds from separators 120 and 130 are passed into a fractionator 150 for separation into products. The fractionator 150 can optionally include a stripper (not shown) for removing contaminants and light gases prior to fractionation. In FIG. 1, the fractionator 150 is shown as generating a light ends fraction 152, a naphtha fraction 154 (due to conversion), and another higher boiling product fraction 156.

FIG. 1 includes several possible locations where microreactors 160 can be included in order to perform mercaptan decomposition. One option is to include microreactors 160 within a separation stage, such as separator 120, separator 130, or both separators 120 and 130. Another option is to include microreactors 160 as part of fractionator 150, such as in a reboiler for the fractionator. Still another option is to include microreactors 160 within the output channel for naphtha product 154, or the output channel for distillate product 156. Any other convenient location for including the microreactors 160 after effluent 115 exits reactor 110 can also be used.

Mercaptan Decomposition Using Microreactors

Although low sulfur regulations for gasoline and diesel products have been in effect for several years, refineries are still struggling to find solutions to reduce or mitigate the effect of mercaptan reversion in fuel products. Historically, the desired target levels for sulfur compounds that sulfur generated by mercaptan reversion did not significantly impact the ability to make a desired low sulfur compound. However, for sulfur specifications near 10 wppm or 15 wppm of sulfur, the amount of sulfur that can be reincorporated into a fuel product by mercaptan reversion is similar in magnitude to the entire sulfur specification. As a result, mercaptan type compounds can represent an important portion of the sulfur compounds present in a desulfurized naphtha product that contains less than 100 wppm of sulfur, such as less than about 50 wppm of sulfur, or less than about 30 wppm, or less than about 15 wppm, or less than about 10 wppm.

Mercaptan formation is an equilibrium process between a mercaptan and $H_2S$ and a corresponding olefin. In this equilibrium higher temperatures and lower pressures favor olefin formation, while higher pressures and lower temperatures favor mercaptan formation.

Mercaptan<====>Olefin+H2S

Because hydroprocessing reactions are exothermic and commercial reactors are adiabatic, the highest reactor temperatures are often found in the outlet of each reactor bed at the end of the cycle conditions. If outlet reactor temperatures are above a given range of temperatures, olefins and $H_2S$ are mainly present in the outlet of a reactor based on the equilibrium. As a product stream cools down below the given range temperature after leaving a hydroprocessing reactor, the cooler temperatures will favor increased mercaptan formation. Depending on the nature of the olefin, the temperature that begins to favor olefin formation is a temperature of at least about 450° F. (232° C.) to about 550° F. (288° C.).

Conventionally, mercaptan decomposition is performed by using an additional bed or portion of hydrotreating catalyst as a post-treatment catalyst inside the main reactor. Since temperature conditions in the bottom of a reactor are higher than the 450° F. to 550° F. range mentioned above, the primary function for a hydrotreating catalyst in the bottom of a hydrotreating reactor is to saturate olefins present in the bottom of the reactor. By saturating the olefins, mercaptan recombination will not take place downstream of the reactor. Usually, the amount of postreatment catalyst loaded in the reactor is small, corresponding to a liquid hourly space velocity (LHSV) of about 5 $hr^{-1}$ to 30 $hr^{-1}$.

By contrast, microreactors can be placed at a location downstream from the hydroprocessing reactor. The microreactors can be in the form of a plurality of individual microreactor channels. Optionally, the microreactors can be formed in a single block, so that an oxide and/or metallic material fills the space between the microreactors. Such a space filling material can assist with transferring heat into or out of the microreactors. For example, a plurality of microreactors can be located in the lower portion of a separator. The separator can operate at a temperature that is below the desired operating temperature of the microreactors, such as 400° F. (204° C.) or less. Electric heating methods (such as resistive heating) can be used to maintain the temperature of the microreactors at a higher temperature than a surrounding vessel containing the microreactors, to facilitate mercaptan decomposition (including olefin saturation). For example, microreactors can be maintained at a temperature of 450° F. (232° C.) or greater while located in a vessel operating at 400° F. (204° C.). More generally, in some embodiments microreactors within a vessel can be maintained at a temperature greater than the temperature of the vessel. The difference in temperature can be at least about 10° C., preferably at least about 25° C., such as at least about 35° C. or at least about 45° C. Maintaining a temperature difference of larger than about 50° C. may be possible, but at some point the amount of additional heating performed on the microreactors will be limited by heat transfer from the microreactors to the surrounding vessel and/or environment. It is noted that if excess heating occurs in a microreactor due to mercaptan decomposition, the space filling material can help carry away the excess heat.

In various embodiments, a plurality of microreactors can form an array or group of microreactors. In combination with a space filling material and/or other structure to maintain the organization of the microreactors, any fluid traveling through a vessel or conduit can preferably pass through the microreactor channels. Alternatively, a portion of a fluid flow can be allowed to bypass the microreactor channels, either through an adjacent opening or via a separate bypass flow path. It is noted that fluid passing through the microreactors may undergo some pressure drop. Thus, if an alternative path is provided for a fluid flow, an undesirable amount of the fluid flow may not be exposed to the hydroprocessing catalyst in the microreactor channels. This potential problem can be mitigated by providing a reduced volume for the alternative flow path and/or having some type of regulator that controls the amount of fluid flow through a separate bypass flow path.

In some embodiments, microreactors for mercaptan decomposition (and/or olefin saturation) can correspond to a plurality of cylindrical channels. More generally, any convenient size and shape for the microreactors can be used, so long as the microreactors satisfy the general dimensions described herein. An individual microreactor can be a channel in a larger structure. For example, microreactors can be formed as channels in a solid structural material, where the material fills the space between the microreactors. Optionally, a heating method for the microreactors can be included within the larger structure, such as wires to allow for electric heating.

In some aspects, existing equipment in a reaction system that includes a hydroprocessing unit can be modified to include microchannel reactors that are loaded with a hydroprocessing catalyst. A plurality of microchannel reactors can be located downstream of the hydroprocessing reactor in a reaction unit. The hydrotreating catalyst in the microchannel reactor can saturate olefins and/or remove mercaptans by hydrodesulfurization reactions. The microchannel reactors can be located in high pressure or low pressure/high temperature separators, or in the reboiler section of a fractionation tower. More generally, the microchannel reactors can be placed in any location Preferably, the microchannel reactors can be placed in a location where at least portion of the $H_2S$ generated during hydroprocessing has been separated from the liquid portion of the effluent. By removing a portion of the $H_2S$ generated during hydroprocessing prior to exposing a flow to the microchannel reactors, the likelihood of further mercaptan reversion can be reduced.

Microstructured or microchannel reactors are widely called microreactors. The dimensions of the channels of a microreactor, such as a length (including diameter) and a depth of the channels, can range from about 10 μm to about 2 mm. Microreactor technology can satisfy three basic requirements for performing a chemical reaction. Due to the small dimensions of a microreactor, a fluid passing through a microreactor can have a short residence time while still providing effective reaction conditions. This is due in part to having a sufficient amount of catalytic surface area relative to a small volume of feed within each microchannel at any given time. Microreactors also can assist with adding or removing heat in order to provide favorable reaction conditions. This can include heating a microreactor relative to the surroundings, or removing heat to maintain a temperature for an exothermic reaction. Additionally, so long as a feed is sufficiently well-mixed with hydrogen prior to entering a microreactor, the small size of a microreactor will mitigate or eliminate most concerns related to mass transfer. Microreactors can allow for a short residence time, introduce or remove the heat and provide sufficient mass transfer.

Microchannel reactors can be applied to effluent from naphtha processing units (pretreating or selective hydrotreating processes), kerosene hydroprocessing units, diesel hydroprocessing units and hydrocracking units. The catalytic metals for a hydrotreatment catalyst can be deposited on the surface of the walls of a microreactor by any convenient method. One option is to impregnate the surface of the walls of a microchannel reactor with metal compounds from aqueous or organic solutions. Other techniques for coating a microreactor surface with a catalytic metal include catalyst powder deposition, sputtering, and atomic layer deposition.

The microchannel reactors can be loaded with a hydrotreating catalyst. Generally, any suitable metals used for a supported hydrotreating catalyst may be used as a catalyst coating in microchannel reactors. Examples of metals for a hydrotreating catalyst include one or more Group VI metals, one or more Group VIII metals, and combinations thereof. Examples of suitable combinations include CoMo, NiMo, NiW, or NiMoW on an alumina or silica-alumina support (in the form of a microreactor surface). The term "Group VI" as utilized herein corresponds to Column 6 of the modern IUPAC Periodic Table of Elements, where the term "Group VIII" as utilized herein corresponds to Columns 8-10 of the modern IUPAC Periodic Table of Elements Generally, processing conditions within a microreactor can include temperatures from about 425° F. (218° C.) to about 800° F. (427° C.), preferably from about 500° F. (260° C.) to about 675° F. (357° C.). In an embodiment, the temperature can be at least about 450° F. (232° C.), or at least about 475° F. (246° C.), or at least about 500° F. (260° C.), or at least about 510° F. (266° C.). Additionally or alternately, the temperature can be about 575° F. (302° C.) or less, or about 540° F. (282° C.) or less, or about 525° F. (274° C.) or less.

Due to the low levels of sulfur and/or olefins as targets for reaction in the microreactors, the hydrogen requirements for mercaptan decomposition (and/or olefin saturation) are low. For microreactors located in a separation stage, such as a low/high pressure or low/high temperature separator, the residual $H_2$ dissolved in the hydroprocessed effluent can provide sufficient hydrogen for the reaction(s). For microreactors located farther downstream, such as microreactors located in reboiler or stripper associated with a fractionator, a partial pressure of about 5 psig to about 25 psig of $H_2$ can be sufficient to facilitate the mercaptan decomposition and/or olefin saturation.

Selective Hydrodesulfurization of Naphtha Feed

One type of processing where microreactors can be used for mercaptan decomposition is for treating an effluent from a selective hydrodesulfurization process. A selective hydrodesulfurization process can be performed in any suitable reaction system. The selective hydrodesulfurization can be performed in one or more fixed bed reactors, each of which can comprise one or more catalyst beds of the same, or different, hydrodesulfurization catalyst. Optionally, more than one type of catalyst can be used in a single bed. Although other types of catalyst beds can be used, fixed beds are preferred. Non-limiting examples of such other types of catalyst beds that may be used in the practice of the present invention include fluidized beds, ebullating beds, slurry beds, and moving beds. Interstage cooling between reactors, or between catalyst beds in the same reactor, can be employed since some olefin saturation can take place, and olefin saturation as well as the desulfurization reaction are generally exothermic. A portion of the heat generated during hydrodesulfurization can be recovered by conventional techniques. Where this heat recovery option is not available, conventional cooling may be performed through cooling utilities such as cooling water or air, or by use of a hydrogen quench stream. In this manner, optimum reaction temperatures can be more easily maintained.

In various embodiments, suitable selective hydrodesulfurization catalysts include catalysts that are comprised of at least one Group VIII metal oxide, preferably an oxide of a metal selected from selected from Co and/or Ni, more preferably Co; and at least one Group VI metal oxide, preferably an oxide of a metal selected from Mo and W, more preferably Mo, on a support material, such as silica or alumina. Other suitable hydrotreating catalysts include zeolitic catalysts, as well as noble metal catalysts where the noble metal is selected from Pd and Pt. It is within the scope of the present invention that more than one type of hydrotreating catalyst be used in the same reaction vessel. The Group VIII metal oxide of a selective hydrodesulfurization catalyst can be present in an amount ranging from about 0.1 to about 20 wt. %, preferably from about 1 to about 12%. The Group VI metal oxide can be present in an amount ranging from about 1 to about 50 wt. %, preferably from about 2 to about 20 wt. %. All metal oxide weight percents are on support. By "on support" we mean that the percents are based on the weight of the support. For example, if the support were to weigh 100 g. then 20 wt. % Group VIII metal oxide would mean that 20 g. of Group VIII metal oxide is on the support.

The hydrodesulfurization catalysts used in the practice of the present invention are preferably supported catalysts. Any suitable refractory catalyst support material, preferably inorganic oxide support materials, can be used as supports for the catalyst of the present invention. Non-limiting examples of suitable support materials include: zeolites, alumina, silica, titania, calcium oxide, strontium oxide, barium oxide, carbons, zirconia, magnesia, diatomaceous earth, lanthanide oxides including cerium oxide, lanthanum oxide, neodynium oxide, yttrium oxide, and praesodymium oxide; chromia, thorium oxide, urania, niobia, tantala, tin oxide, zinc oxide, and aluminum phosphate. Preferred are alumina, silica, and silica-alumina. It is to be understood that the support material can also contain small amounts of contaminants, such as Fe, sulfates, silica, and various metal oxides that can be introduced during the preparation of the support material. These contaminants are present in the raw materials used to prepare the support and will preferably be present in amounts less than about 1 wt. %, based on the total weight of the support. It is more preferred that the support material be substantially free of such contaminants. In another embodiment, about 0 to about 5 wt. %, preferably from about 0.5 to about 4 wt. %, and more preferably from about 1 to about 3 wt. % of an additive can be present in the support, which additive is selected from the group consisting of phosphorus and metals or metal oxides from Group IA (alkali metals) of the Periodic Table of the Elements.

Generally, selective hydrodesulfurization conditions can include temperatures from about 425° F. (218° C.) to about 800° F. (427° C.), preferably from about 500° F. (260° C.) to about 675° F. (357° C.). In an embodiment, the temperature at the start of a reaction run can be at least about 450° F. (232° C.), or at least about 475° F. (246° C.), or at least about 500° F. (260° C.), or at least about 510° F. (266° C.). In another embodiment, the temperature at the start of a run can be about 575° F. (302° C.) or less, or about 540° F. (282° C.) or less, or about 525° F. (274° C.) or less.

In an embodiment, the temperature at the end of a processing run can be about 800° F. (427° C.) or less, or about 750° F. (399° C.) or less, or about 700° F. (371° C.) or less, or about 675° F. (357° C.) or less, or about 650° F. (343° C.) or less. In another embodiment, the temperature at the end of a processing run can be at least about 550° F. (288° C.), or at least about 575° F. (302° C.), or at least about 600° F. (316° C.), or at least about 625° F. (329° C.).

Other selective hydrodesulfurization conditions can include a pressure of from about 60 psig (414 kPa) to about 800 psig (5516 kPa), preferably from about 200 psig (1379 kPa) to about 500 psig (3447 kPa), more preferably from about 250 psig (1724 kPa) to about 400 psig (2758 kPa). The hydrogen feed rate can be from about 500 standard cubic feet per barrel (scf/b) (84.2 $m^3/m^3$) to about 6000 scf/b (1011 $m^3/m^3$), preferably from about 1000 scf/b (168.5 $m^3/m^3$) to about 3000 scf/b (505.5 $m^3/m^3$). The liquid hourly space velocity can be from about of about 0.5 $hr^{-1}$ to about 15 $hr^{-1}$, preferably from about 0.5 $hr^{-1}$ to about 10 $hr^{-1}$, more preferably from about 1 $hr^{-1}$ to about 5 $hr^{-1}$.

In various embodiments, a goal of a selective hydrodesulfurization process can be to produce a naphtha product having a desired level of sulfur. In an embodiment, the desired level of sulfur can be at least about 5 wppm, or at least about 10 wppm, or at least about 20 wppm. In another embodiment, the desired level of sulfur can be about 50 wppm or less, or about 30 wppm or less, or about 15 wppm or less, or about 10 wppm or less. Performing a mercaptan decomposition can assist with meeting such a target by reducing or eliminating the amount of organic sulfur that is added back into a hydrodesulfurized effluent after the effluent leaves the hydrodesulfurization reactor. Due to mercaptan reversion, a hydrodesulfurized effluent may have an increase in sulfur level to about 100 wppm or less, such as at least about 50 wppm, or at least about 30 wppm, or at least about 15 wppm. Passing at least a portion of a hydrodesulfurization effluent through the microreactors for mercaptan decomposition can reduce the sulfur content of the hydrodesulfurization effluent so that a desired level of sulfur described above is achieved in the naphtha product.

Hydroprocessing of a Distillate Feed

Another type of processing where microreactors can be used for mercaptan decomposition is for treating a naphtha boiling range effluent from hydroprocessing of a distillate (or higher boiling) feed. The hydroprocessing can include hydrodesulfurization, hydrocracking, or another type of hydroprocessing. In some embodiments, the hydroprocessing can be under conditions that are effective for substantial conversion of a portion of the feedstock relative to a boiling point, such as conversion relative to 700° F. (371° C.) or conversion relative to 400° F. (204° C.). The amount of conversion can correspond to at least about 10 wt % of the portion of a feed that had a boiling point above the conversion temperature, such as at least about 20 wt % or at least about 30 wt %. Processes that result in substantial conversion of a feed can correspond to processes that involve at least some cracking of the feed. Such process conditions are also commonly suitable for creating olefins in resulting product fractions, such as a naphtha fuel fraction.

One option for hydroprocessing a distillate (or higher boiling) feedstock is to hydrotreat the feedstock. Desulfurization can include exposing the feedstock to one or more beds of catalyst in one or more hydrotreatment stages. Optionally, one or more partial beds, full beds, and/or stages of hydrocracking catalyst can also be used. A hydrotreatment process can typically involve exposing a feed to a catalyst in the presence of hydrogen. In some embodiments, a hydrotreating catalyst can include a Group VI metal and/or a Group VIII metal on a support. Suitable metals can include cobalt, nickel, molybdenum, tungsten, or combinations thereof. Suitable supports can include silica, silica-alumina, alumina, titania, and combinations thereof. In some embodiments, multiple beds of catalyst can be used. Multiple hydrotreatment stages can also be used within a reactor and/or reaction system for hydrodesulfurization.

The reaction conditions in a hydrotreatment stage can be conditions suitable for reducing the sulfur content of the feedstream. The reaction conditions can include an LHSV of about 0.3 $hr^{-1}$ to about 5.0 $hr^{-1}$, a total pressure from about 500 psig (3.4 MPa) to about 3000 psig (20.7 MPa), and a temperature of from about 500° F. (260° C.) to about 800° F. (427° C.). Alternatively, the reaction conditions can include an LHSV of from about 0.5 $hr^{-1}$ to about 1.5 $hr^{-1}$, a total pressure from about 1400 psig (9.7 MPa) to about 2000 psig (13.8 MPa), and a temperature of from about 700° F. (371° C.) to about 750° F. (399° C.).

During hydrotreatment, the sulfur and nitrogen contents of a feedstock are reduced. The reaction conditions in a hydrotreatment reactor can be conditions effective for reducing the sulfur and/or nitrogen content of the feedstream. In an embodiment, the sulfur content of the feed can be reduced to about 20 wppm or less, or about 15 wppm or less, or about 10 wppm or less. The nitrogen content can be reduced to about 20 wppm or less, or about 15 wppm or less, or about 10 wppm or less.

Another hydroprocessing option for distillate (or higher boiling range) feed is to expose the feed to a hydrocracking catalyst under effective hydrotreatment and/or hydrocracking conditions. The hydrocracking catalyst can be included as part of a bed and/or stage that contains hydrotreatment catalyst, or the hydrocracking catalyst can be included in a separate bed and/or stage within desulfurization stages, or the hydrocracking catalyst can be in a separate bed and/or stage that is after any optional prior hydrotreatment stages. Examples of hydrocracking catalysts can include supported catalysts containing nickel, nickel-cobalt-molybdenum, cobalt-molybdenum and nickel-tungsten and/or nickel-molybdenum. In another embodiment, the catalyst can include nickel and at least one of tungsten and molybdenum. Non-limiting examples of noble metal catalysts include those based on platinum and/or palladium. More generally, a hydrocracking catalyst can include at least one metal from Groups 8-10 of the IUPAC periodic table and optionally at least one metal from Group 6 of the IUPAC periodic table. Porous support materials which may be used for both the noble and non-noble metal catalysts comprise a refractory oxide material such as alumina, silica, alumina-silica, kieselguhr, diatomaceous earth, magnesia, or zirconia, with alumina, silica, alumina-silica being preferred and the most common. Zeolitic supports including the large pore faujasites such as USY can also be used. In an embodiment, the hydrocracking conditions can be selected based on the hydrotreating conditions.

In some embodiments, the hydrocracking conditions can be selected based on effective hydrotreating conditions. Alternatively, suitable hydrocracking conditions can include temperatures of from about 200° C. to about 450° C., hydrogen pressures of from about 5 barg (0.5 MPa) to about 300 barg (30 MPa), liquid hourly space velocities of from about $0.05\ h^{-1}$ to about $10\ h^{-1}$, and hydrogen treat gas rates of from 35.6 m$^3$/m$^3$ to 1781 m$^3$/m$^3$ (200 SCF/B to 10,000 SCF/B).

In various embodiments, the sulfided base metals can include nickel and a combination of molybdenum and tungsten. The molar ratio of Group VIII to Group VI metals can be from about 2:1 to about 1:2. As noted above, the molar ratio of molybdenum to tungsten can have a value from about 3:1 to about 1:3. The combination of nickel, molybdenum, and tungsten can provide a substantial portion of the desulfurization activity of the catalyst. This desulfurization activity can increase as the molar ratio of molybdenum to tungsten approaches 1:1.

The conditions in the hydroprocessing stages can be effective to convert at least a portion of the feedstock into lower boiling compounds. In an embodiment, the desulfurization stages can convert at least about 5% of the feed relative to a conversion temperature of about 371° C., such as at least about 10% of the feed, or at least about 20% of the feed, or at least about 30% of the feed. The amount of conversion is measured based on the portion of a feed with a boiling point greater than the conversion temperature prior to hydroprocessing.

Configuration Example 1

Selective Hydrodesulfurization of Naphtha with Mercaptan Decomposition

Figure 2:
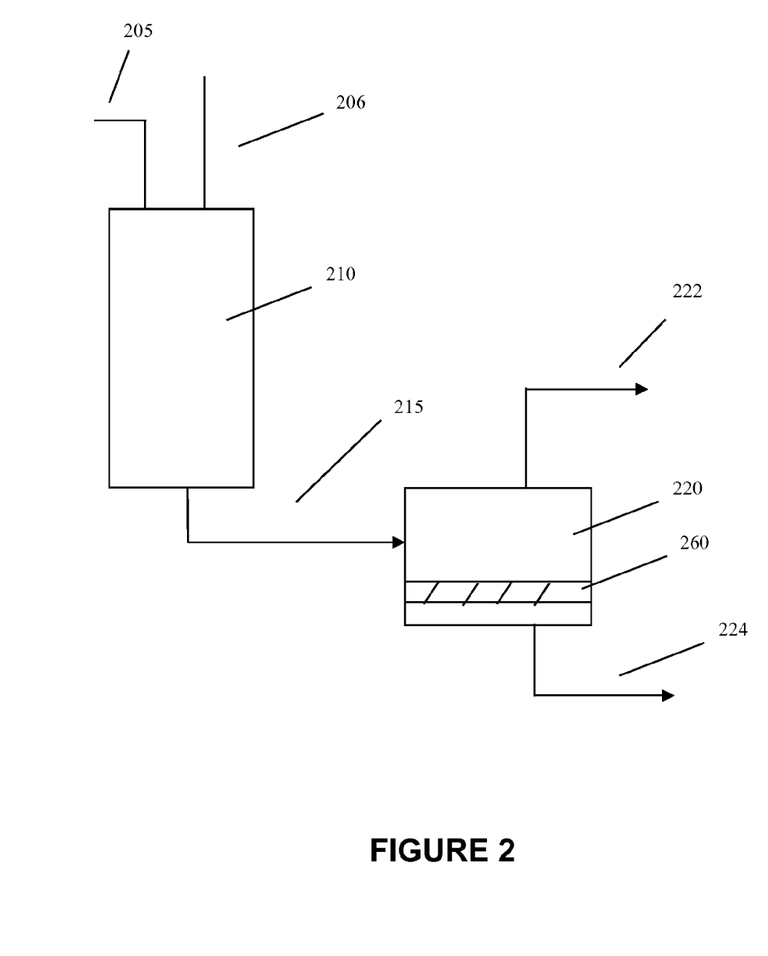
FIG. 2 schematically shows a reaction system for performing a process according to an embodiment of the invention.

FIG. 2 shows an example of a reaction system for performing mercaptan decomposition on the liquid effluent from a selective hydrodesulfurization process for a naphtha boiling range feed. In this example, the mercaptan decomposition microreactors are included within one or more separation stages after the selective hydrodesulfurization process.

In FIG. 2, an olefin-containing naphtha boiling range feed 205 and a hydrogen flow 206 are introduced into one or more reactors and/or reaction stages 210 for performing a selective hydrodesulfurization. The effluent 215 from reactor 210 is then passed into at least one separation stage 220. Separation stage 220 is represented in FIG. 2 as a single separator, but in other embodiments a plurality of separators can be used to perform a separation. In FIG. 2, separator 220 is a gas-liquid separator for separating contaminants and light ends from a desired liquid (naphtha) effluent. In the configuration shown in FIG. 2, separator 220 can also include a plurality of microreactors 260. The desired product passes through the microreactors 260 before exiting separator 220 as liquid effluent 224. A gas phase effluent 222 is also retrieved from the separator 220. Depending on the temperature used for separator 220, the microreactors 260 can be heated to a temperature between about 400° F. (204° C.) 550° F. (288° C.), such as at least about 450° F. (232° C.), in order to remove mercaptans from the selectively desulfurized naphtha liquid effluent.

Configuration Example 2

Hydrocracking of Distillate with Mercaptan Decomposition

Figure 3:
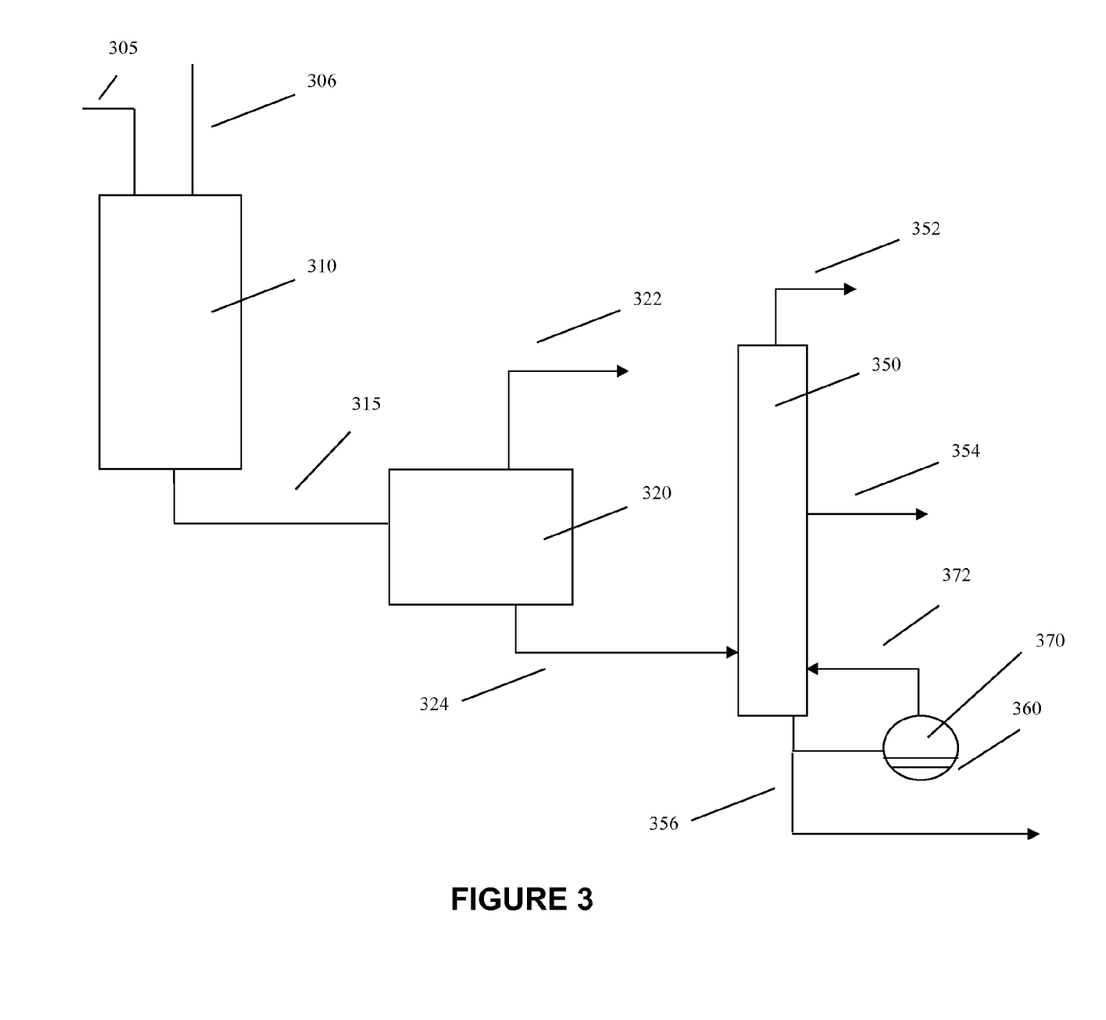
FIG. 3 schematically shows a reaction system for performing a process according to an embodiment of the invention.

FIG. 3 shows an example of a reaction system for performing mercaptan decomposition on the liquid effluent from a hydrocracking process for a distillate boiling range feed, such as hydrocracking of a light cycle oil. In this example, the mercaptan decomposition microreactors are included within a reboiler associated with a stripping and fractionation process for separating a cracked naphtha product from an unconverted distillate product.

In FIG. 3, a distillate boiling range feed 305 and a hydrogen flow 306 are introduced into one or more reactors and/or reaction stages 310 for performing hydrocracking. The effluent 315 from reactor 310 is passed into at least one separation stage 320. Separation stage 320 is represented in FIG. 3 as a single separator, but in other embodiments a plurality of separators can be used to perform a separation. Separator 320 generates at least a gas phase effluent 322 containing contaminants and light ends, and a liquid phase effluent 324. The liquid phase effluent 324 is then stripped and sent to a fractionator 350 to separate a light ends product 352, a naphtha product 354, and a distillate (bottoms) product 356. In the configuration shown in FIG. 3, the fractionator 350 has an associated reboiler 370 that includes a plurality of microreactors 360. A portion of the fractionator bottoms is diverted into the reboiler 370, which provides the heat energy via a fractionator reboiler stream 372 that is used to vaporize the liquid effluent 324 for fractionation. The diverted portion of the fractionator bottoms passes through the microreactors 360 as a vapor, resulting in mercaptan decomposition for naphtha boiling range mercaptans that pass through the reboiler. Depending on the temperature used for reboiler 370, the microreactors 360 can be heated or cooled to a temperature between about 400° F. (204° C.) and 600° F. (316° C.), such as at least about 450° F. (232° C.) or about 550° F. (316° C.) or less. This can reduce the sulfur content of any portion of the naphtha product 354 that passes through the reboiler 370.

Configuration Example 3

Hydroprocessing of Vacuum Gas Oil with Mercaptan Decomposition

Figure 4:
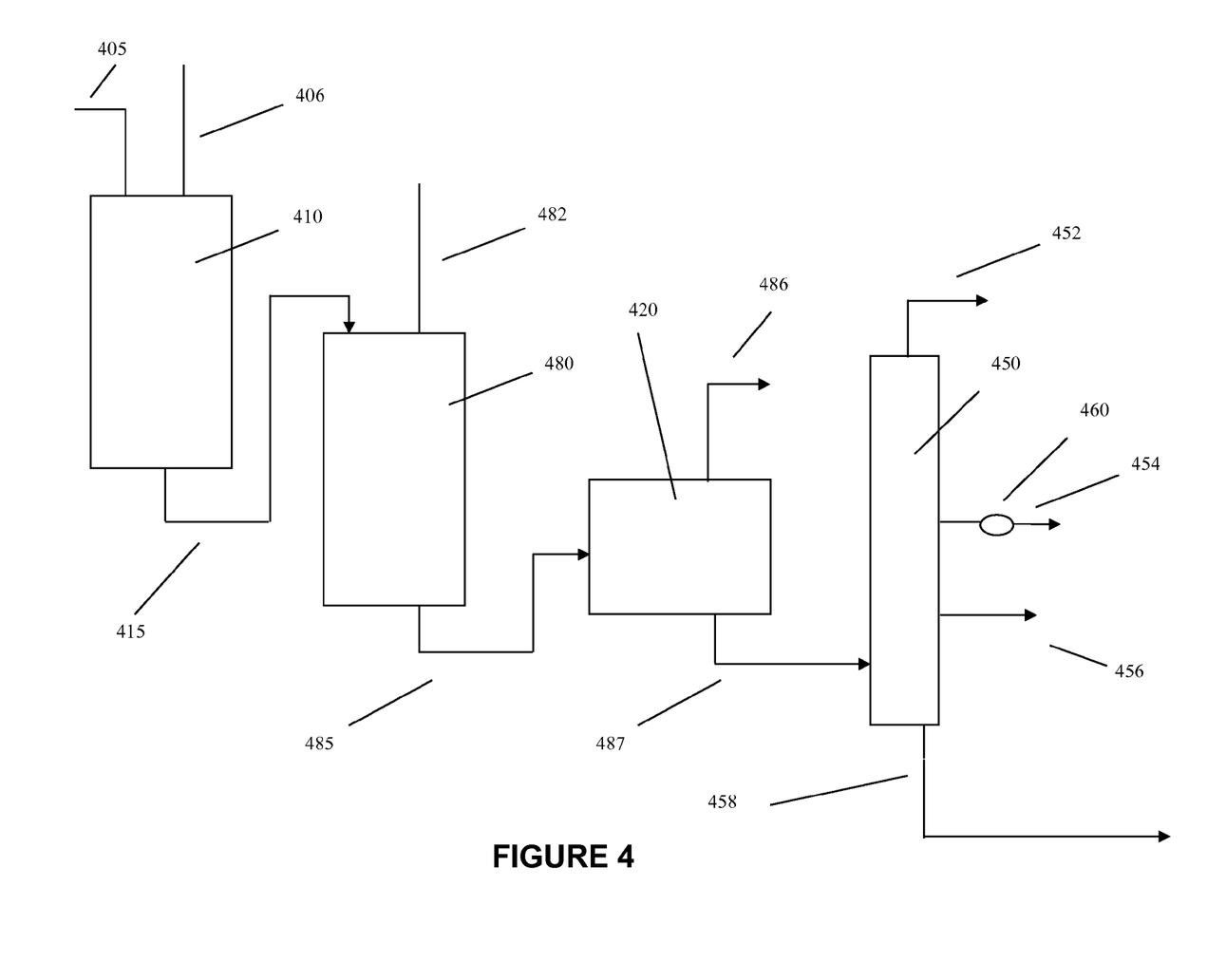
FIG. 4 schematically shows a reaction system for performing a process according to an embodiment of the invention.

FIG. 4 shows an example of a reaction system for performing mercaptan decomposition on the liquid effluent from a hydrotreating and hydrocracking process for a heavy oil feed, such as lubes hydrocracking of a vacuum gas oil. In this example, the mercaptan decomposition microreactors are included within output conduits associated with a fractionation process.

In FIG. 4, a distillate or heavy oil boiling range feed 405 and a hydrogen flow 406 are introduced into one or more reactors and/or reaction stages 410 for performing hydrotreating. The effluent 415 from reactor 410 is passed into at least one hydrocracking stage or reactor 480. A hydrogen-containing gas can be added to reactor 410 via conduit 482. In some alternative embodiments, any other convenient arrangement of hydrotreating and hydrocracking stages can be used, include optional intermediate separation stages to remove at least a portion of the contaminant gases generated during hydrotreating. The effluent 485 from hydrocracking reactor 480 is then passed into separation stage 420. Separation stage 420 is represented in FIG. 4 as a single separator, but in other embodiments a plurality of separators can be used to perform a separation. Separator 420 generates at least a gas phase effluent 486 containing contaminants and light ends, and a liquid phase effluent 487. The liquid phase effluent 487 is then stripped and sent to a fractionator 450 to separate a light ends product 452, a naphtha product 454, a distillate product 456, and a bottoms product 458. In the configuration shown in FIG. 4, a plurality of microreactors 460 are included in the output conduit for naphtha product 454. Alternatively, if more than one naphtha boiling range product stream is generated, microreactors can be include in as many output conduits as desired. The products exiting via conduit 454 pass through the corresponding microreactors 460, resulting in mercaptan decomposition. Depending on the temperature in the output conduits, the microreactors 464 can be heated to a temperature between about 400° F. (204° C.) and 600° F. (316° C.), such as at least about 450° F. (232° C.) or about 550° F. (316° C.) or less, in order to facilitate removal of mercaptans.

Additional Embodiments

Embodiment 1

A method for treating a naphtha boiling range fraction, comprising: receiving a hydroprocessed effluent comprising a naphtha boiling range fraction, the naphtha boiling range fraction comprising a sulfur content of about 200 wppm or less and comprising at least about 50 wppm of olefins, mercaptans, or a combination thereof; and exposing at least a portion of the naphtha boiling range fraction to a hydrotreating catalyst at a temperature of from about 400° F. (204° C.) to about 600° F. (316° C.), preferably at least about 450° F. (232° C.) and preferably about 550° F. (288° C.) or less, to form a treated effluent portion having a sulfur content of about 50 wppm or less, the treated effluent portion having a lower sulfur content than the sulfur content of the naphtha boiling range fraction, wherein the hydrotreating catalyst is located on surfaces of walls for a plurality of microreactors, the plurality of microreactors having a length dimension of about 10 μm to about 2 mm and a depth dimension of about 10 μm to about 2 mm, the plurality of microreactors being located in a different vessel from a hydroprocessing reaction stage that generated the naphtha boiling range fraction.

Embodiment 2

The method of Embodiment 1, further comprising: performing a hydrodesulfurization process on a naphtha boiling range feed to form a desulfurized effluent; passing the desulfurized effluent into a separation stage; and separating the desulfurized effluent to form at least a gas phase effluent and a naphtha boiling range effluent, the naphtha boiling range fraction comprising at least a portion of the naphtha boiling range effluent.

Embodiment 3

The method of Embodiments 1 or 2, wherein the hydrodesulfurization process comprises a selective hydrodesulfurization process and wherein the naphtha boiling range fraction comprises at least about 20 wt % of olefins.

Embodiment 4

The method of Embodiment 1, further comprising: hydroprocessing a feedstock under effective conditions to convert at least 10 wt % of the feedstock relative to a conversion temperature to form a hydroprocessed effluent, at least 30 wt % of the feedstock having a boiling point greater than the conversion temperature, the hydroprocessed effluent including a naphtha boiling range portion; passing the hydroprocessed effluent into a separation stage; separating the hydroprocessed effluent to form at least a gas phase effluent and a liquid phase effluent; and fractionating at least a portion of the liquid phase effluent to form the naphtha boiling range fraction, the naphtha boiling range fraction comprising at least a portion of the naphtha boiling range portion.

Embodiment 5

The method of Embodiment 4, wherein the feedstock comprises a distillate boiling range feedstock, the conversion temperature being at least about 400° F. (204° C.).

Embodiment 6

The method of Embodiments 4 or 5, wherein the conversion temperature is about 700° F. (371° C.) or less.

Embodiment 7

The method of any of Embodiment 4 to 6, wherein the hydroprocessing comprises at least one of hydrotreating the feedstock under effective hydrotreating conditions and hydrocracking the feedstock under effective hydrocracking conditions.

Embodiment 8

The method of any of Embodiments 2 to 7, wherein a mercaptan content of the desulfurized effluent or the hydroprocessed effluent prior to passing the desulfurized effluent or hydroprocessed effluent into the separation stage is less than a mercaptan content of the naphtha boiling range fraction.

Embodiment 9

The method of any of Embodiments 2 to 8, wherein separating the desulfurized effluent is performed in one or more separators, the plurality of microreactors being located in at least one of the one or more separators.

Embodiment 10

The method of any of Embodiments 2 to 8, wherein the plurality of microreactors are associated with a fractionator for performing a fractionation, the microreactors preferably being located in one or more output conduits of the fractionator.

Embodiment 11

The method of any of the above embodiments, wherein the naphtha boiling range fraction has a sulfur content of about 25 wppm or less and/or the treated effluent portion has a sulfur content of about 15 wppm or less.

Embodiment 12

The method of any of the above embodiments, wherein the temperature for exposing the naphtha boiling range fraction to the hydrotreating catalyst is at least about 25° C. greater than a temperature of the vessel the microreactors are located in.

Embodiment 13

The method of any of the above embodiments, wherein the naphtha boiling range fraction is exposed to the hydrotreating catalyst in the presence of about 5 psig to about 25 psig of hydrogen.

Embodiment 14

The method of any of the above embodiments, wherein the naphtha boiling range fraction comprises at least about 5 wt % of olefins.

What is claimed is:

1. A method for treating a naphtha boiling range fraction, comprising:
   receiving a hydroprocessed effluent comprising a naphtha boiling range fraction, the naphtha boiling range fraction comprising a sulfur content of about 200 wppm or less and comprising at least about 50 wppm of olefins, mercaptans, or a combination thereof; and
   exposing at least a portion of the naphtha boiling range fraction to a hydrotreating catalyst at a temperature of from about 400° F. (204° C.) to about 600° F. (316° C.) and H$_2$ at a partial pressure of about 5 psig to about 25 psig to form a treated effluent portion having a sulfur content of about 50 wppm or less, the treated effluent portion having a lower sulfur content than the sulfur content of the naphtha boiling range fraction,
   wherein the hydrotreating catalyst is located on surfaces of walls for a plurality of microchannels, the plurality of microchannels having a length dimension of about 10 µm to about 2 mm and a depth dimension of about 10 µm to about 2 mm, the plurality of microchannels being located in a different vessel from a hydroprocessing reaction stage that generated the naphtha boiling range fraction.

2. The method of claim 1, further comprising:
   performing a hydrodesulfurization process on a naphtha boiling range feed to form a desulfurized effluent;
   passing the desulfurized effluent into a separation stage; and
   separating the desulfurized effluent to form at least a gas phase effluent and a naphtha boiling range effluent, the naphtha boiling range fraction comprising at least a portion of the naphtha boiling range effluent.

3. The method of claim 2, wherein a mercaptan content of the desulfurized effluent prior to passing the desulfurized effluent into the separation stage is less than a mercaptan content of the naphtha boiling range fraction.

4. The method of claim 2, wherein separating the desulfurized effluent is performed in one or more separators, the plurality of microchannels being located in at least one of the one or more separators.

5. The method of claim 2, further comprising fractionating the desulfurized effluent, the plurality of microchannels being associated with a fractionator for performing the fractionating.

6. The method of claim 4, wherein the plurality of microchannels are located in one or more output conduits of the fractionator.

7. The method of claim 2, wherein the hydrodesulfurization process comprises a selective hydrodesulfurization process and wherein the naphtha boiling range fraction comprises at least about 20 wt % of olefins.

8. The method of claim 1, further comprising:
   hydroprocessing a feedstock under effective conditions to convert at least 10 wt % of the feedstock relative to a conversion temperature to form a hydroprocessed effluent, at least 30 wt % of the feedstock having a boiling point greater than the conversion temperature, the hydroprocessed effluent including a naphtha boiling range portion;
   passing the hydroprocessed effluent into a separation stage;
   separating the hydroprocessed effluent to form at least a gas phase effluent and a liquid phase effluent; and
   fractionating at least a portion of the liquid phase effluent to form the naphtha boiling range fraction, the naphtha boiling range fraction comprising at least a portion of the naphtha boiling range portion.

9. The method of claim 8, wherein a mercaptan content of the naphtha boiling range portion prior to passing the hydroprocessed effluent into the separation stage is less than a mercaptan content of the naphtha boiling range fraction.

10. The method of claim 8, wherein the plurality of microchannels are located in one or more output conduits from the fractionator that correspond to the at least one naphtha boiling range fraction.

11. The method of claim 8, wherein the feedstock comprises a distillate boiling range feedstock.

12. The method of claim 11, wherein the conversion temperature is at least about 400° F. (204° C.).

13. The method of claim 8, wherein the conversion temperature is about 700° F. (371° C.) or less.

14. The method of claim 8, wherein the hydroprocessing comprises at least one of hydrotreating the feedstock under effective hydrotreating conditions and hydrocracking the feedstock under effective hydrocracking conditions.

15. The method of claim 1, wherein the naphtha boiling range fraction has a sulfur content of about 25 wppm or less and the treated effluent portion has a sulfur content of about 15 wppm or less.

16. The method of claim 1, wherein the naphtha boiling range fraction is exposed to the hydrotreating catalyst at a temperature of about 450° F. (232° C.) to about 550° F. (288° C.).

17. The method of claim 1, wherein the temperature for exposing the naphtha boiling range fraction to the hydrotreating catalyst is at least about 25° C. greater than a temperature of the vessel the microchannels are located in.

19. The method of claim 1, the naphtha boiling range fraction is exposed to the hydrotreating catalyst in the presence of about 5 psig to about 25 psig of hydrogen.

19. The method of claim 1, wherein the naphtha boiling range fraction comprises at least about 5 wt % of olefins.

* * * * *